United States Patent [19]

Koyama et al.

[11] Patent Number: 4,861,348

[45] Date of Patent: Aug. 29, 1989

[54] FUEL REFORMING APPARATUS

[75] Inventors: Kazuhito Koyama; Shigehisa Sugita, both of Hitachi; Seiichiro Sakaguchi, Ibaraki; Nobuhiro Seiki, Hitachi; Asao Hanzawa, Ibaraki, all of Japan

[73] Assignee: Hitachi, Ltd., Tokyo, Japan

[21] Appl. No.: 105,808

[22] Filed: Oct. 8, 1987

[30] Foreign Application Priority Data

Oct. 8, 1986 [JP] Japan ................................ 61-237963
Nov. 17, 1986 [JP] Japan ................................ 61-271956

[51] Int. Cl.$^4$ .............................................. B01J 7/00
[52] U.S. Cl. ..................................... 48/94; 48/196 A; 422/202; 422/203; 422/204; 422/211
[58] Field of Search .................. 48/94, 95, 61, 196 A; 422/197, 202, 204, 205, 211, 203, 311, 312; 429/19

[56] References Cited

U.S. PATENT DOCUMENTS

| | | | |
|---|---|---|---|
| 3,063,493 | 11/1962 | Weiss | 422/211 |
| 3,144,312 | 8/1964 | Mertens | 48/95 |
| 3,541,729 | 11/1970 | Dantowitz | 48/94 |
| 3,635,682 | 1/1972 | Vine et al. | 422/204 |
| 3,909,299 | 9/1975 | Corrigan | 48/94 |
| 4,071,330 | 1/1978 | Sederquist | 48/94 |
| 4,234,593 | 11/1980 | Matovich | 422/205 |
| 4,430,304 | 2/1989 | Spurner et al. | 422/204 |
| 4,714,593 | 12/1987 | Nieto et al. | 48/94 |

FOREIGN PATENT DOCUMENTS 21126118 3/1984 United Kingdom ................ 422/197

Primary Examiner—Peter Kratz
Attorney, Agent, or Firm—Antonelli, Terry & Wands

[57] ABSTRACT

A fuel reforming apparatus includes a reaction tube for causing endothermic reaction for converting a fuel gas with hydrocarbon, steam, and the like mixed therein into a hydrogen-enriched gas using a catalyst, a combustor for generating a combustion gas for heating the reaction tube, a heat insulating layer for preventing the radiation of the combustion gas, and a combustion gas passage disposed around the reaction tube and allowing the combustion gas to flow therethrough, and a passage for air or fuel gas disposed around the fuel gas passage, a heat insulating layer being disposed around the outer peripheral surface of this passage.

12 Claims, 12 Drawing Sheets

FUEL REFORMING APPARATUS

BACKGROUND OF THE INVENTION

1. Field of the Invention

The present relates to a fuel reforming apparatus, and, more particularly, to a fuel reforming apparatus suitable for use in a fuel-cell power apparatus which is compact and of which rapid load-following characteristics are required.

2. Statement of the Related Art

A fuel reforming apparatus disclosed in U.S. Pat. No. 4,098,589, for instance, is known as a fuel reforming apparatus for use in a fuel-cell power apparatus which is compact and of which rapid load-following characteristics are required, unlike fuel reforming apparatuses that are conventionally used in the chemical industry. In the fuel reforming apparatus of this patent, a reaction tube is made compact by improving the heat conductivity between the reaction tube on the one hand, and a combustion gas and a reforming gas on the other. Consequently, the fuel reforming apparatus is made compact and the load-following characteristics are improved.

In the above-described prior art, a reaction tube is provided in a central portion of a fuel reforming apparatus, and a combustion gas is circulated through the reaction tube. These portions are surrounded by a heat insulating layer to prevent the radiation of heat. However, since the combustion gas and the heat insulating layer are disposed adjacent to each other, there has been a drawback in that the heat insulating layer tends to become thick, and the proportion of the heat insulating layer in the fuel reforming apparatus is large. In addition, the combustion gas heats a wide area inside the heat insulating layer, and no consideration has hitherto been paid to the loss of the quantity of heat of the combustion gas involved in the heating thereof.

SUMMARY OF THE INVENTION

Accordingly, an object of the present invention is to provide a fuel reforming apparatus which is capable of making effective use of the quantity of heat of a combustion gas and which is compact.

In accordance with one aspect of the invention, there is provided a fuel reforming apparatus provided with an air passage which covers a high-temperature gas between a high-temperature combustion gas passage and the low-temperature open air.

In accordance with another aspect of the invention, there is provided a fuel reforming apparatus provided with a supplying passage for fuel gas via a heat-exchange wall between a heat insulating layer and a combustion gas passage so that the heat of the fuel gas issued from the combustion gas passage to the outside of the reforming apparatus is imparted to the fuel gas passing through the supplying passage for fuel gas, whereby the heat from the combustion gas is utilized to promote the reforming reaction involving endothermic reaction.

According to still another aspect of the invention, there is provided a fuel reforming apparatus having a reaction tube for causing endothermic reaction for converting a fuel gas with hydrocarbon, steam, and the like mixed therein into a hydrogen-enriched gas using a catalyst and a heat insulating layer for preventing the radiation of the combustion gas, the apparatus comprising: a combustion gas passage disposed around the reaction tube and constituting a passage for the combustion gas; and a supplying passage for fuel gas disposed around the combustion gas passage via a heat-exchange wall and constituting a passage for the fuel gas, the heat insulating layer being disposed around the outer peripheral surface of the supplying passage for fuel gas.

According to a further aspect of the invention, there is provided a fuel reforming apparatus having a reaction tube for causing endothermic reaction for converting a fuel gas with hydrocarbon, steam, and the like mixed therein into a hydrogen-enriched gas using a catalyst and a heat insulating layer for preventing the radiation of the combustion gas, the apparatus comprising: a combustion gas passage disposed around the reaction tube and constituting a passage for the combustion gas; and a supplying passage for fuel gas which is disposed around the combustion gas passage via a heat-exchange wall and constitutes a passage for the fuel gas and in which the catalyst is filled, the heat insulating layer being disposed around the outer peripheral surface of the supplying passage for fuel gas.

The above and other objects, features and advantages of the present invention will become apparent from the following detailed description of the invention when read in conjunction with the accompanying drawings.

BRIEF DESCRIPTION OF THE DRAWINGS

FIG. 3b is a horizontal cross-sectional view taken along the line IIIb—IIIb of FIG. 3a;

FIG. 4b is a horizontal cross-sectional view taken along the line IVa—IVa of FIG. 4a;

FIG. 5b is a horizontal cross-sectional view taken along the line Vb—Vb of FIG. 5a;

FIG. 6b is a horizontal cross-sectional view taken along the line VIb—VIb of FIG. 6a;

FIG. 7b is a horizontal cross-sectional view taken along the line VIIb—VIIb of FIG. 7a.

DESCRIPTION OF THE PREFERRED EMBODIMENTS

Figure 1:
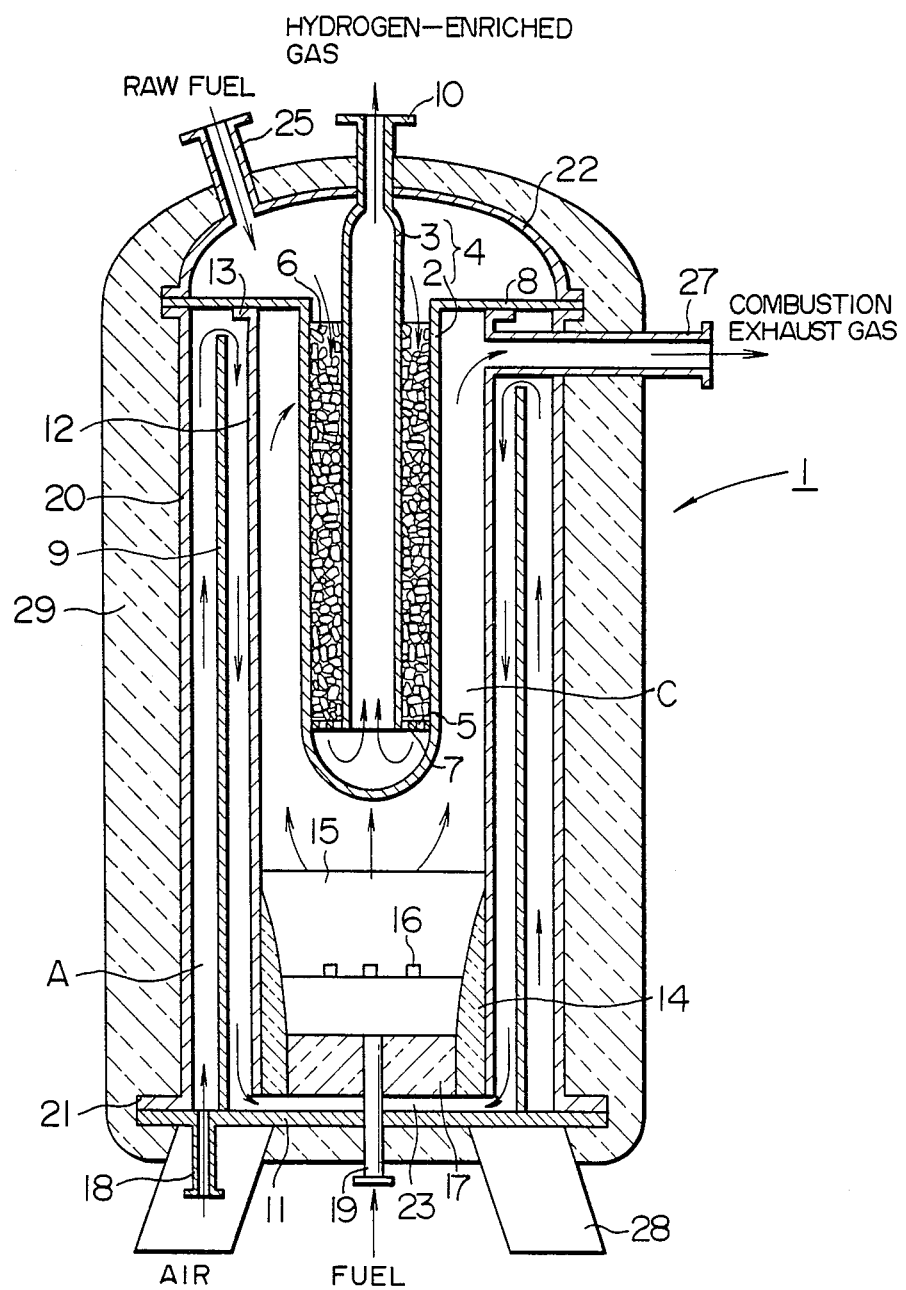
FIG. 1 is a vertical cross-sectional view of a fuel reforming apparatus in accordance with a first embodiment of the present invention.

FIG. 1 shows a fuel reforming apparatus in accordance with a first embodiment of the present invention. A reaction tube 4 of a double tube structure which is constituted by an outer reaction tube 2 and an inner reaction tube 3 is provided in a central portion of this fuel reforming apparatus 1. One end of the outer reaction tube 2 is fluid-tightly closed. A catalyst supporting plate 5 is installed at an end of the inner reaction tube 3 which is located inside the outer reaction tube 2, and a reforming catalyst 6 is filled in a gap between the outer reaction tube 2 and the inner reaction tube 3. Incidentally, a hole 7 is provided in the catalyst supporting plate 5. An opening portion of the outer reaction tube 2 is jointed to a supporting plate 8, and a flow guide 9 is secured to a bottom plate 11 at one end thereof. A guide wall 12 for combustion gas is provided inwardly of the flow guide 9 with a space therebetween, and a flange provided at an upper end thereof is secured to the supporting plate 8. A combustion gas passage C is formed in a space between the outer reaction tube 2 and the guide wall 12 for combustion gas, and is connected to an exhaust tube 27. A heat insulating member 14 is provided such as to be in contact with a lower part of an inner surface of the guide wall 12 for combustion gas. A combustor 15 is disposed at a position surrounded by the heat insulating member 14. In the combustor 15, a number of nozzles 16 are disposed to face the bottom of the outer reaction tube 2. A supporting member 17, which also serves as a heat insulating member, is disposed at a lower portion of the combustor 15 with a space between it and the bottom plate 11. A fuel tube 19 for combustion is connected to the combustor 15 to penetrate the bottom plate 11 and the supporting member 17. An inner wall 20 of the reforming apparatus is provided at a position surrounding the flow guide 9. The inner wall 20 of the reforming apparatus is cylindrical, and one end thereof is a flange 21, which is connected to the bottom plate 11. Meanwhile, the other end of the inner wall 20 of the reforming apparatus is welded or bolted to an end plate 22 with the supporting plate 8 placed therebetween. The end plate 22 is disposed at a position at which it covers the supporting plate 8 with a certain gap between it and the supporting plate 8. An air passage A is formed in the space between the flow guide 9 and the inner wall 20 of the reforming apparatus. The inner reaction tube 3 penetrates a central portion of the end plate 22, and these members are welded and fixed together. One of the inner reaction tube 3 communicates with an exhaust tube 10 for raw fuel. An air supply tube 18 for introducing air into the air passage A is provided in the bottom plate 11, while a raw fuel tube 25 for supplying raw fuel is provided in the end plate 22.

Furthermore, a number of legs 28 for supporting the main body of the fuel reforming apparatus 1 are provided for the bottom plate 11. The bottom plate 11, the inner wall 20 of the reforming apparatus, and the end plate 22 are covered with a heat insulating layer 29, and the fuel reforming apparatus 1 is thus arranged.

In this arrangement, although the inner reaction tube 3, the outer reaction tube 2, the guide wall 12 for combustion gas, the flow guide 9, and the inner wall 20 of the reforming apparatus are disposed concentrically. However, a plurality of the reaction tubes of a double tube structure may be provided.

In operation, combustion air is supplied from the air supply tube 18 to the air passage A, while combustion fuel is supplied from the fuel tube 19 to the combustor 15.

Flames are formed at the nozzles 16 and generate a high-temperature combustion gas. The combustion gas flows through the combustion gas passage C between the guide wall 12 for combustion gas and the outer reaction tube 2 and is, while raising the temperature of the reaction tube 4 of a double tube structure and the reforming catalyst 6, led from the exhaust tube 27 to outside the fuel reforming apparatus 1.

Raw fuel to be reformed, such as methane, is mixed with steam, and is then supplied through the raw fuel supply tube 25 and led into the reaction tube 4. The raw fuel is heated by the combustion gas, is subjected to the following endothermic reaction in a layer in which the reforming catalyst 6 is filled, and is thereby converted to a hydrogen-enriched gas:

$$CH_4 + H_2O \rightarrow CO + 3H_2 \tag{1}$$

$$CO + H_2O \rightarrow CO_2 + H_2 \tag{2}$$

The hydrogen-enriched gas passes through the exhaust tube 10 for raw fuel and is exhausted to outside the fuel reforming apparatus 1.

The air flows through the air passage A and, at the same time, cools the flow guide 9, and the temperature of the air rises. The air which has come out of the air passage A flows through a space formed by the flow guide 9 and the guide wall 12 for combustion gas and cools the guide wall 12 for combustion gas.

The provision of these air passages makes it possible to reduce the temperature of the guide wall 12 for combustion gas, the flow guide 9, and the inner wall 20 of the reforming apparatus in that order and to make the thickness of the heat insulating layer 29 thinner than in the case where the air passages are not provided. In addition, since the guide wall 12 for combustion gas is cooled, the durability thereof can be enhanced. The air which has passed through the flow guide 9 and the guide wall 12 for combustion gas passes through a lower air passage 23 and is led into the combustor 15, where it is used as combustion air.

The combustion gas generated at the combustor 15 heats the outer reaction tube 2, flows through the combustion gas passage C, and is exhausted from the exhaust tube 27 to outside the reforming apparatus.

The heat insulating layer 29 prevents the loss of radiation from the inner wall 20 of the reforming apparatus to the atmosphere.

In this first embodiment, since the flow guide 9 is provided and air passages surrounding the guide wall in a dual structure are provided, it is possible to reduce the temperature of the guide wall 12 for combustion to an even lower level, thereby effectively reducing the radiation loss. In other words, the air passage A surrounding the high-temperature combustion gas passage C is cooled by the air which flows therethrough, and the temperature of the members constituting the air passage can be reduced lower than the temperature of the constituent members of a combustion gas passage in a conventional structure which is not provided with air passages. For example, the temperature of the outer surface of the reforming apparatus ranging from 600° to 1,000° C. can be lowered to the vicinity of the temperature of the supply air.

Accordingly, since the thickness of the heat insulating layer for preventing the heat loss to the atmosphere can be made thin, the overall dimensions of the reforming apparatus can be made compact. Furthermore, the air which flows through the air passages and is heated by heat issuing from the combustion gas passage can be utilized for combustion, so that the heat loss can be reduced.

Figure 2:
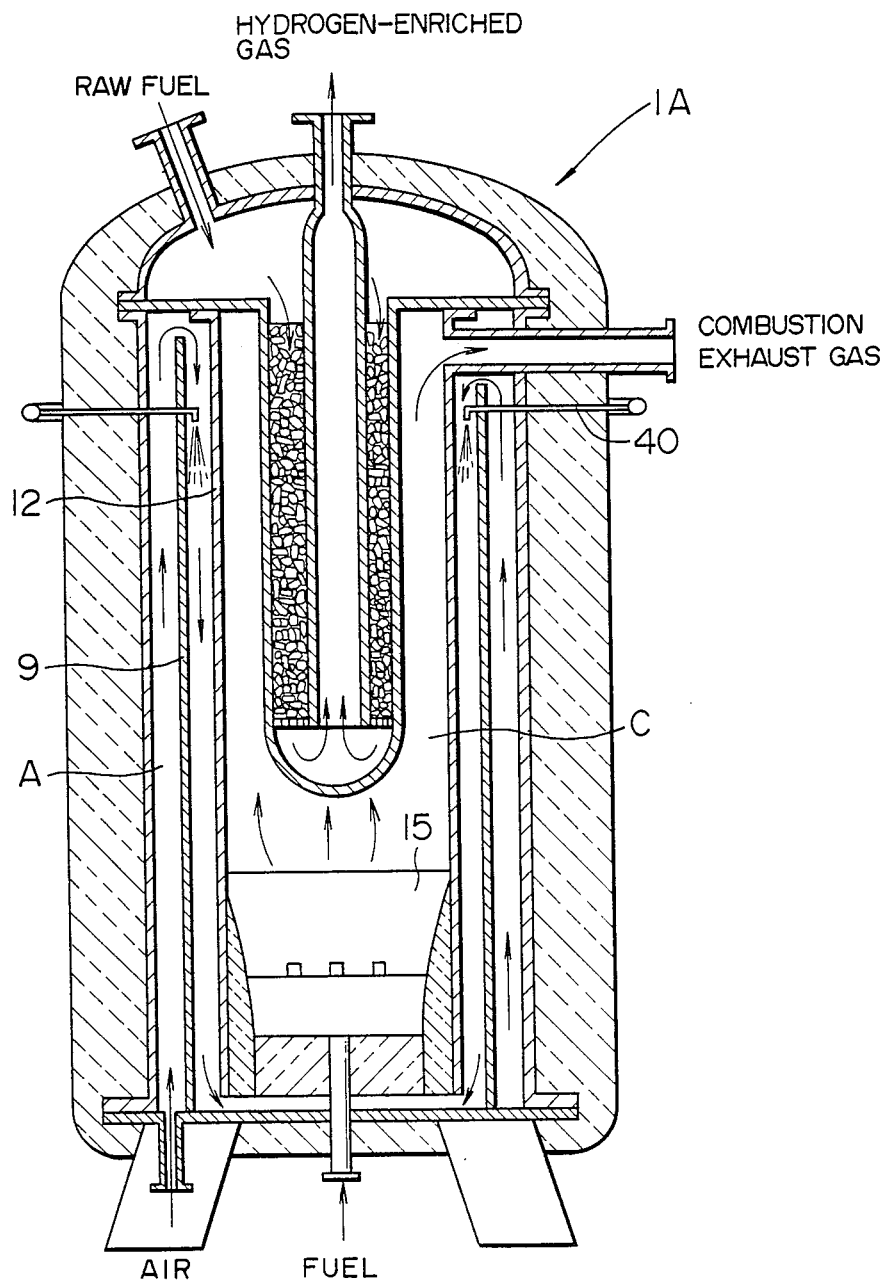
FIG. 2 is a vertical cross-sectional view of a fuel reforming apparatus in accordance with a second embodiment of the present invention.

FIG. 2 shows a fuel reforming apparatus 1A in accordance with a second embodiment of the present invention. This fuel reforming apparatus differs from the fuel reforming apparatus 1 shown in FIG. 1 in that an auxiliary combustion burner 40 is provided in a space formed by the guide wall 12 for combustion gas and the flow guide 9. The auxiliary combustion burner 40 burns fuel by using the air flowing between the guide wall 12 for combustion gas and the flow guide 9. This auxiliary combustion burner 40 is used to raise the temperature of the guide wall 12 for combustion gas within a short time at the time of starting the fuel reforming apparatus. In particular, the auxiliary combustion burner 40 is effective when a combustion catalyst which requires preheating is used for the combustor 15. Alternatively, an electric heater may be used instead of the auxiliary combustion burner. In this case, favorable combustion takes place since the air temperature can be raised without changing the rate of oxygen in the air which is supplied to the combustor. The fuel reforming apparatus in accordance with this second embodiment is advantageous in that the starting time can be shortened.

Figure 3A:
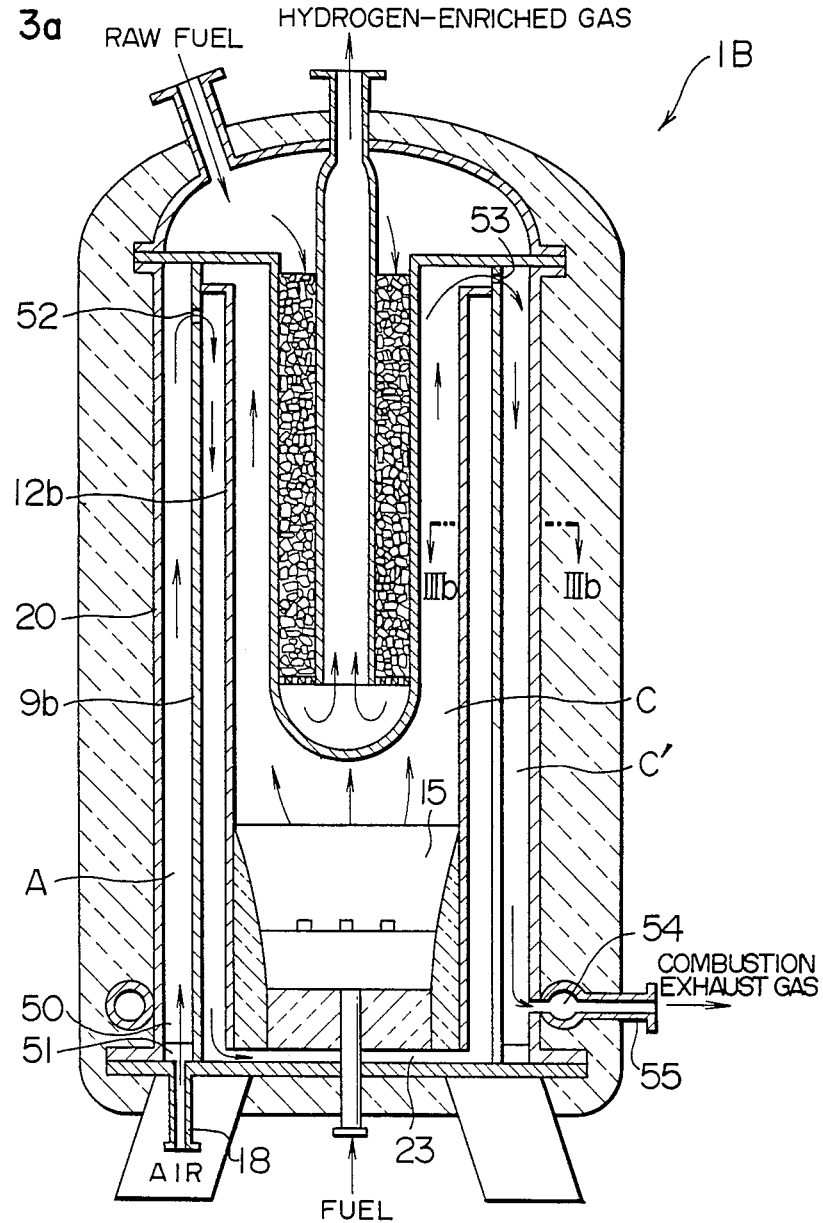
FIG. 3a is a vertical cross-sectional view of a fuel reforming apparatus in accordance with a third embodiment of the present invention.
Figure 3B:
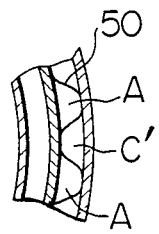

FIG. 3a shows a fuel reforming apparatus 1B in accordance with a third embodiment of the present invention. This fuel reforming apparatus differs from the fuel reforming apparatus 1 of the first embodiment shown in FIG. 1 in the following aspect:

A flow guide 9b is provided in a space between a guide wall 12b for combustion gas and the inner wall 20 of the reforming apparatus, and a heat exchanger plate 50 is provided in a space between the inner wall 20 of the reforming apparatus and the flow guide 9b (see FIG. 3b). The air supply tube 18 communicates with an air manifold 51, which is turn communicates with a part A of a space formed by the inner wall 20 of the reforming apparatus, the flow guide 9b, and the heater exchanger plate 50. The other portion of the space formed by the inner wall 20 of the reforming apparatus, the flow guide 9b, and the transfer plate 50 communicates with the combustion gas passage C by means of a combustion gas communicating hole 53 and also communicates with a combustion gas manifold 54.

In operation, the air flows from the air supply tube 18 into the air manifold 51, and flows into the space formed by the inner wall 20 of the reforming apparatus, the flow guide 9b, and the heat exchanger plate 50. Communicating holes may be provided in this space so that the air passages A and combustion gas passages C' may be formed alternately. The air which flows through the air passage A receives heat from the combustion gas via the heat exchanger plate 50. The air which has flowed through the space passes through the air hole 52, flows into the space formed by the flow guide 9b and the guide wall 12b for combustion gas, cools the guide wall 12b for combustion gas, and is supplied to the combustor 15 via the air passage 23 disposed below the combustor 15.

The combustion gas generated in the combustor 15 flows through the combustion gas passage C, flows through the combustion gas passage formed by the flow guide 9b, the inner wall 20 of the reforming apparatus, and the heat exchanger plate 50, and preheats the air via the heat exchanger plate 50. The combustion gas with its temperature lowered flows into the combustion gas manifold 54, and is exhausted from an exhaust tube 55 for combustion gas to the outside.

According to this third embodiment, it is possible to reduce the capacity of a device for recovering the heat of a combustion exhaust gas since the sensible heat of the combustion exhaust gas is recovered inside the fuel reforming apparatus so as to be used as combustion air.

Figure 4A:
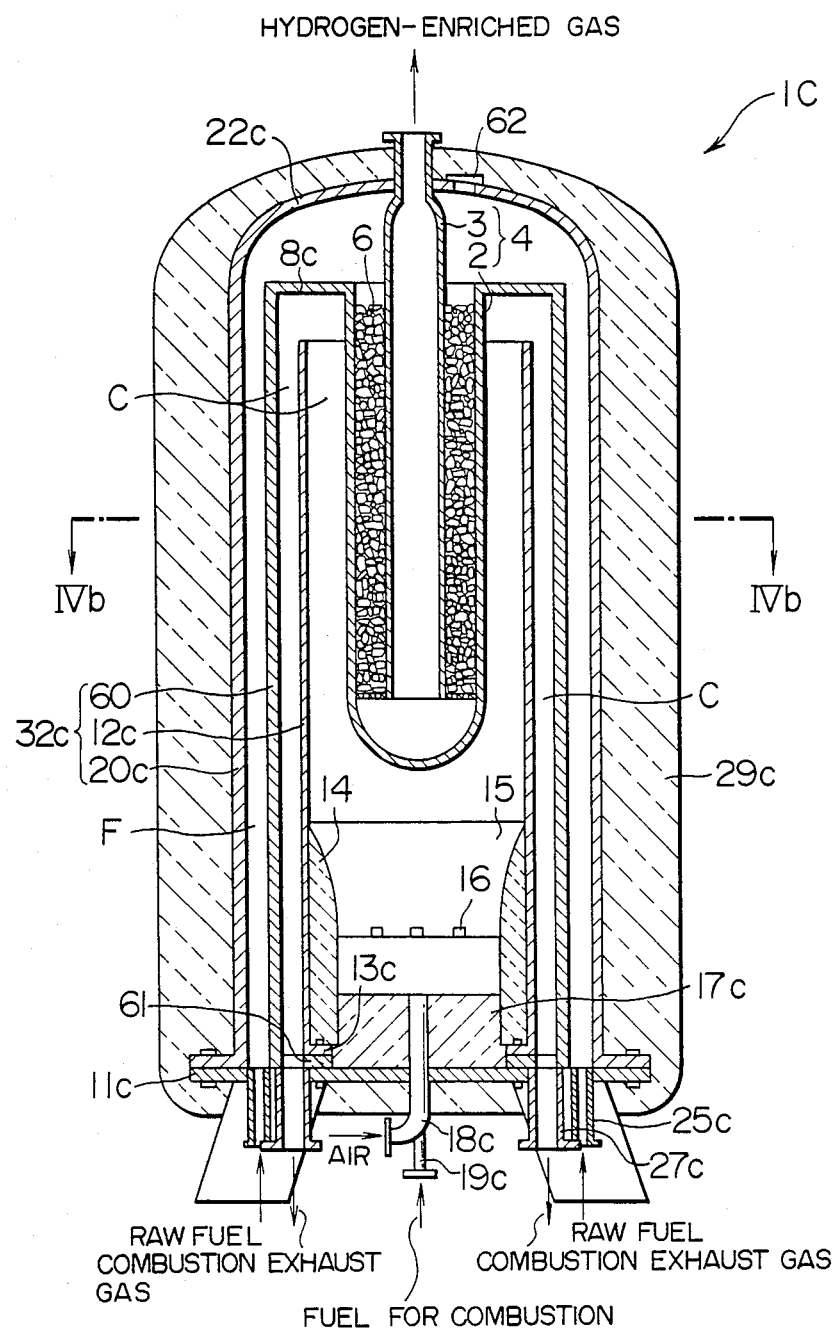
FIG. 4a is a vertical cross-sectional view of a fuel reforming apparatus in accordance with a fourth embodiment of the present invention.

FIG. 4a shows a fuel reforming apparatus 1C in accordance with a fourth embodiment of the present invention. Description will be made hereafter of the fuel reforming apparatus 1C with respect to its differences with the fuel reforming apparatus in accordance of the first embodiment shown in FIG. 1.

A supporting plate 8c is jointed to a heat-exchange wall 60. A terminating end of the heat-exchange wall 60 is formed as a flange 61 and is fixed to a bottom plate 11c. A guide wall 12c for combustion gas is provided on the inner side of the heat-exchange wall 60 with a gap therebetween, and a flange provided at one end thereof is secured to a bottom plate 11c together with a flange 61 of the heat-exchange wall 60. Combustion passages C are formed in a space between the outer reaction tube 2 and the guide wall 12c for combustion and in a space between the guide wall 12c for combustion and the heat-exchange wall 60. A heat insulating member 14 is disposed in contact with the flange 13c and along the inner wall 12c for combustion gas up to a certain length thereof. In addition, a supporting member 17c which also serves as a heat-insulating material is disposed between the combustor 15 and the bottom plate 11c. Furthermore, an air tube 18c and a fuel tube 19c for combustion are connected to the combustor 15 in such a manner as to penetrate the bottom plate 11c and the supporting member 17c. An inner wall 20c of the reforming apparatus is disposed such as to surround the heat-exchange wall 60. The other end of the inner wall 20c of the reforming apparatus is welded to a semi-elliptical end plate 22c, and a supplying passage F for fuel gas is formed in a space between the heat-exchange wall 60 and the inner wall 20c of the reforming apparatus. Incidentally, a catalyst charging port 62 is provided in the end plate 22c at a place slightly distant from the position where the inner reaction tube 3 is located. Several raw fuel tubes 25c for supplying raw fuel to a supplying passage F for fuel gas are provided in the bottom plate 11c. In addition, several exhaust tubes 27c are provided for introducing the exhaust gas from the combustion gas passage C to outside the fuel reforming apparatus 1C.

Figure 4B:
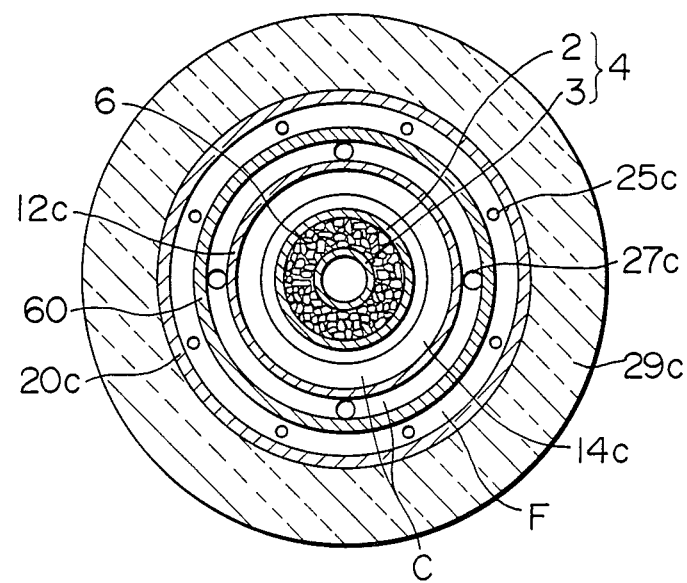

FIG. 4b shows a cross-sectional view of the fuel reforming apparatus 1C taken along the line IVb—IVb of FIG. 4a. In this arrangement, the guide wall 12c, the heat-exchange wall 60, and the inner wall 20c of the reforming apparatus are disposed concentrically, but a plurality of the reaction tubes 4 of a double tube structure may be provided. In addition, although eight raw fuel tubes 25c and four exhaust tubes 27c are provided symmetrically about a point, the number and arrangement thereof may be determined, as necessary.

The operation of this embodiment will now be described.

First, the air and the combustion fuel both preheated by the combustor 15 are respectively led to the air tube 18c and the fuel tube 19c for combustion, and the combustion fuel is burned in the combustor. Flame is formed by the nozzles 16 and generate a high-temperature combustion gas. The combustion gas flows through the combustion gas passage C between the guide wall 12c for the combustion and the outer reaction tube 2. While raising the temperature of the reaction tube 4 of a double tube structure and the reforming catalyst 6, the combustion gas flows through the combustion gas passage C between the heat-exchange wall 60 and the guide wall 12c for combustion gas, and is led from the exhaust tube 27c to outside the fuel reforming apparatus 1C as an exhaust combustion gas. At that juncture, in order to effect a uniform temperature rise of the reaction tube 4 of a double tube structure as well as to reduce the time duration of temperature rise, a preheated fluid, such as nitrogen, is allowed to flow from the raw fuel tube 25c via the supplying passage F for fuel gas until the temperatures of the reaction tube 4 and the reforming catalyst 6 rise to predetermined levels, while the reforming catalyst 6 held in the reaction tube 4 of a double tube structure is heated directly. After directly heating the reforming catalyst 6, the fluid is led outside the fuel reforming apparatus 1C via the inner reaction tube 3. In addition, in the above-described process, while flowing through the supplying passage F for fuel gas, the fluid for directly heating the reforming catalyst 6 receives heat and is heated through the heat-exchange wall 60 by the combustion gas flowing in the combustion gas passage C between the heat-exchange wall 60 and the guide wall 12c for combustion gas.

In other words, a heat-exchange portion 32c, which constitutes a feature of the present invention, is formed by virtue of the arrangement of the guide wall 12c for combustion gas, the heat-exchange wall 60, and the inner wall 20c of the reforming apparatus.

After the reaction tube 4 of a double tube structure and the reforming catalyst 6 reach predetermined temperatures, the fluid which is allowed to flow through the raw fuel tube 25c is changed over to a raw fuel in which, for instance, preheated methane and steam are mixed. Upon entering the fuel reforming apparatus 1C, the raw fuel is heated by the combustion gas, and is converted to a hydrogen-enriched gas in the layer in which the reforming catalyst 6 is filled. The hydrogen-enriched gas then passes through the inner reaction tube 3 and is discharged to outside the fuel reforming apparatus 1C.

According to this fourth embodiment, since heating of a high temperature level can be effected from inside and outside of the reaction tube of a double tube structure at the time of increasing the temperature of the fuel reforming apparatus, there is an advantage in that the time duration required for increasing the temperature, i.e., the rise time, can be shortened. In addition, since the heat exchange can be effected between the raw fuel and the combustion gas in the fuel reforming apparatus during a normal operation, there is an additional advantage in that a preheater for the raw material fed from the outside can be made compact.

Figure 5A:
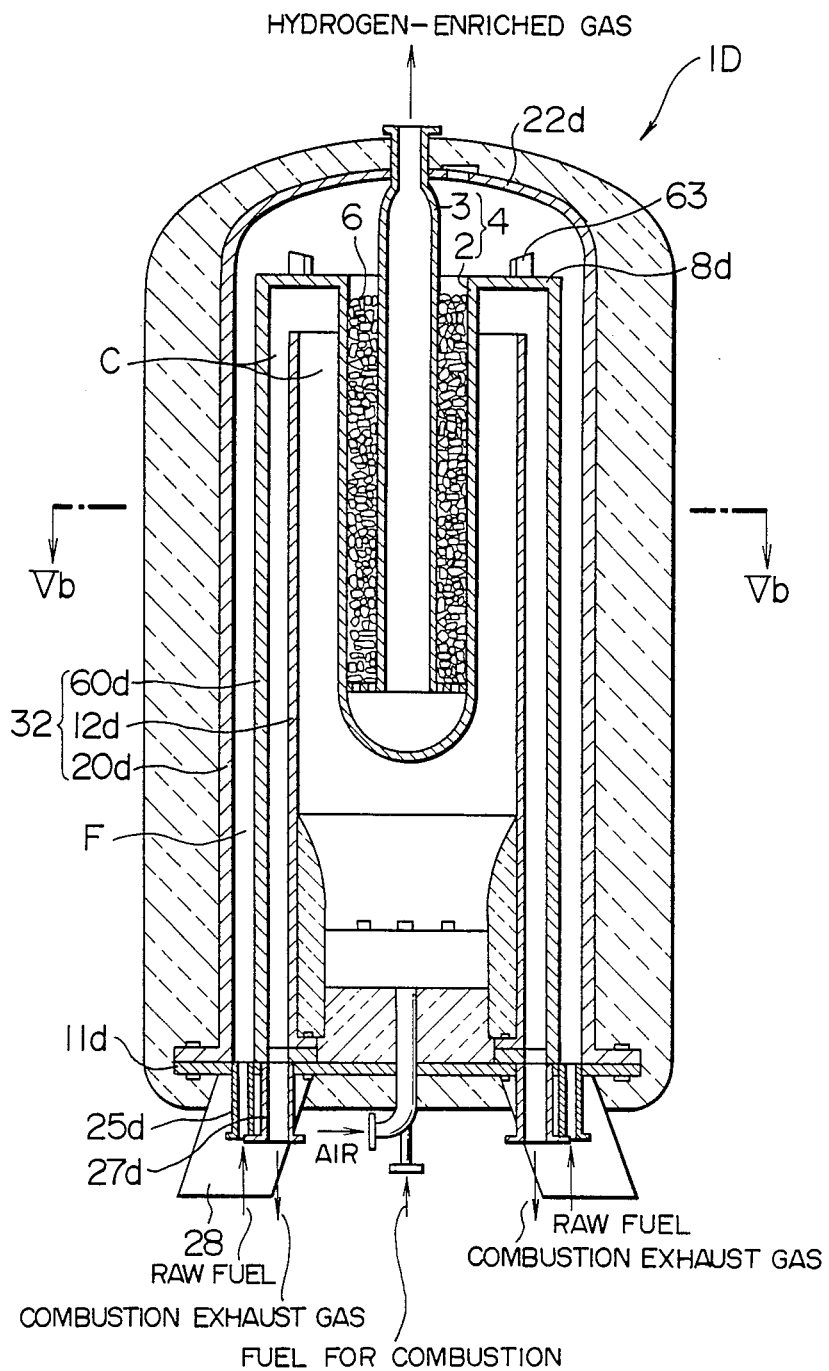
FIG. 5a is a vertical cross-sectional view of a fuel reforming apparatus in accordance with a fifth embodiment of the present invention.

FIG. 5a shows a fuel reforming apparatus 1D in accordance with a fifth embodiment of the present invention. Description will be made hereafter of its differences with the fuel reforming apparatus 1C in accordance with the fourth embodiment shown in FIG. 4a.

Figure 5B:
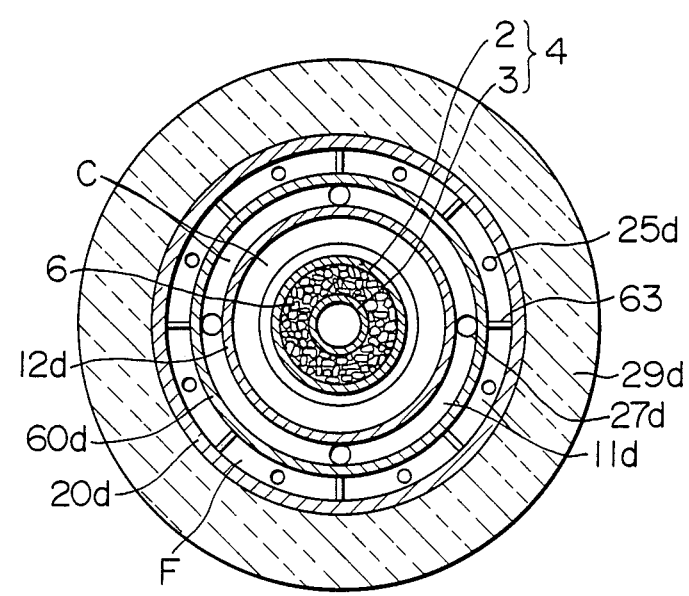

In FIG. 5a, drift preventing plates 63 jointed to a heat-exchange wall 60d are provided inside a supplying passage F for fuel gas in such a manner as to project vertically from a bottom plate 11d. This arrangement is a characteristic feature of this embodiment. Each of the drift preventing plates 63 is arranged in such a manner that one longitudinal end thereof abuts against the bottom plate 11d, and the other end thereof projects from a supporting plate 8d toward the side of an end plate 22d. As shown in FIG. 5b, the drift preventing plates 63 are respectively disposed at central positions between adjacent raw material tubes 25d disposed on the bottom plate 11d. Each of the drift preventing plates 63 has a slight gap between the same and an inner wall 20d of the reforming apparatus and is thereby adapted to prevent the collision between the drift preventing plate 63 and the inner wall 20d of the reforming apparatus owing to thermal expansion.

By virtue of the above-described arrangement, the raw material fed from the raw fuel tubes 25d into the fuel reforming apparatus 1D is led into the space between the supporting plate 8d and the end plate 22d, while a certain flow rate is maintained in a supplying passage F for fuel gas surrounded by the inner wall 20d of the reforming apparatus, the heat-exchange wall 60d, and the adjacent drift preventing plates 63. Subsequently, the raw fuel passes through the layer charged with the reforming catalyst 6, and is discharged outside the fuel reforming apparatus 1D as a hydrogen-enriched gas.

According to the fifth embodiment, if members having good thermal conductivity are used as the drift preventing plates, since the drift preventing plates serve as fins for transmitting heat from the combustion gas to the raw fuel, the raw fuel is heated more effectively. Hence, in addition to the advantages of the fourth embodiment shown in FIG. 4a, there are advantages in that the rising time of the fuel reforming apparatus can be further reduced, and that an external preheater for preheating the raw fuel can be made more compact.

Figure 6A:
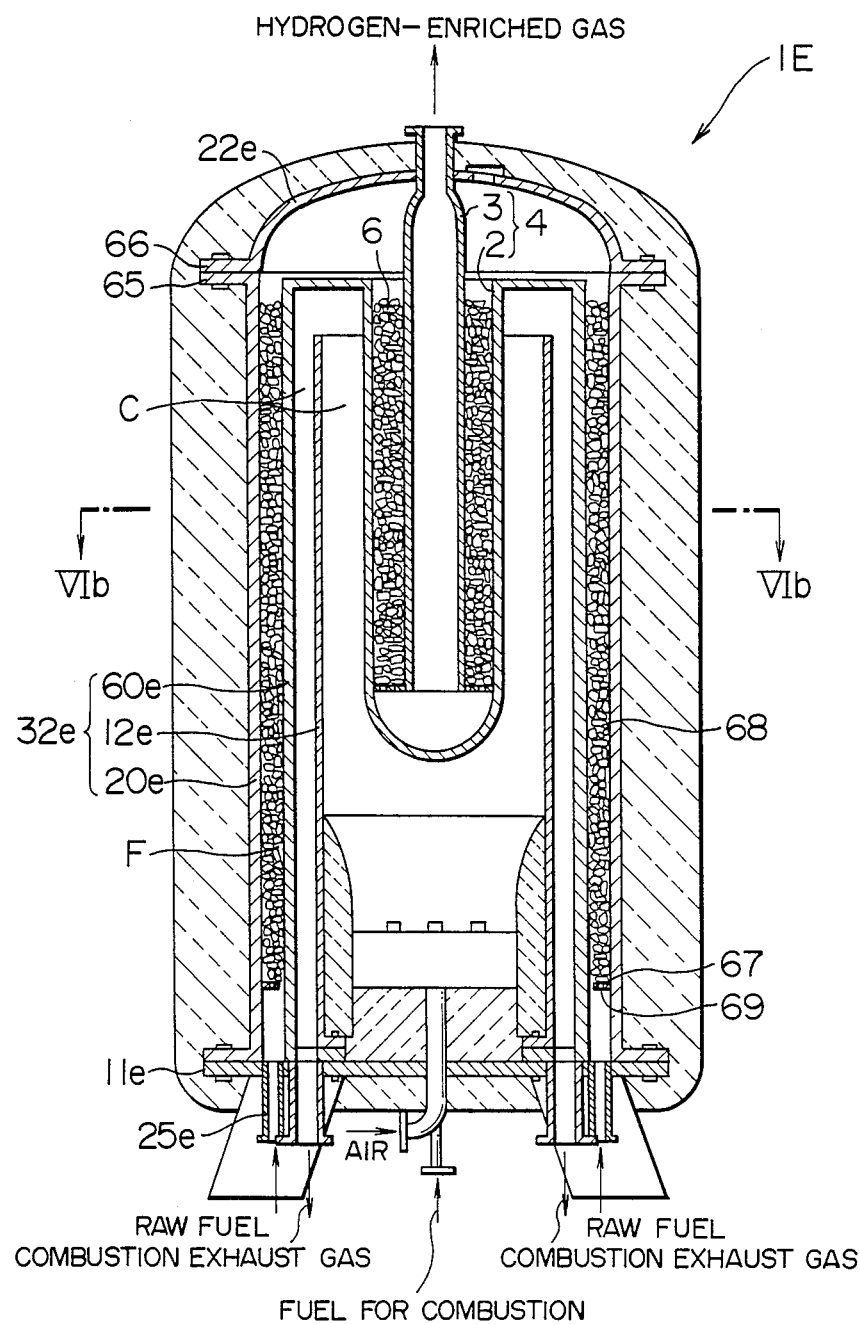
FIG. 6a is a vertical cross-sectional view of a fuel reforming apparatus in accordance with a sixth embodiment of the present invention.

FIG. 6a shows a fuel reforming apparatus 1E in accordance with a sixth embodiment of the present invention. Description will be made hereafter of its differences with the fuel reforming apparatus 1C according to the fourth embodiment shown in FIG. 4.

Figure 6B:
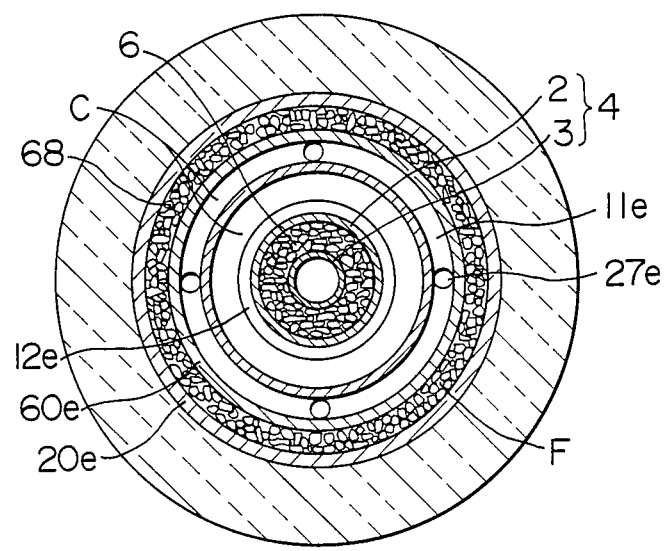

In FIG. 6a, an inner wall 20e of the reforming apparatus and a semi-elliptical end plate 22e are not welded to each other, but are respectively provided with flanges 65, 66 and are flange-connected to each other. A catalyst supporting plate 67 is welded to the inner wall 20e of the reforming apparatus such as to surround a heat-exchange wall 60e. A reforming catalyst 68 is filled in the supplying passage F for fuel gas from the catalyst supporting plate 67 toward the end plate 22e side. The catalyst supporting plate 67 is provided with a hole 69, and a slight gap is provided between the catalyst supporting plate 67 and the heat-exchange wall 60e. By virtue of the above-described arrangement, the raw fuel flowing into the supplying passage F for fuel gas through the raw fuel tube 25e passes the heat-exchange wall 60e, and receives heat transmitted from the combustion gas to the reforming catalyst 68 side via the heat-exchange wall 60e. Hence, the raw fuel is subjected to the aforementioned reactions (1) and (2) while being brought into contact with the reforming catalyst 68. One condition for obtaining a maximum reforming rate of the raw fuel is to retain these reactions at approximately 800° C. or above. However, the temperature of the layer charged with the reforming catalyst 68 does not reach that level. Therefore, unreformed raw fuel is reformed in the layer charged with the reforming catalyst 6 in the reaction tube 4 of a double tube structure, and is converted to a desired hydrogen-enriched gas before it is discharged outside the fuel reforming apparatus 1E. FIG. 6b shows a cross-sectional view taken along the line VIb—VIb of FIG. 6a.

According to the sixth embodiment, since the temperature of the inner wall 20e of the reforming apparatus with which the reforming catalyst is brought into contact in conjunction with the endothermic reaction in the reforming catalyst-charged layer 68, there is an advantage in that the life of the inner wall 20e of the reforming apparatus with respect to the temperature is improved.

Figure 7A:
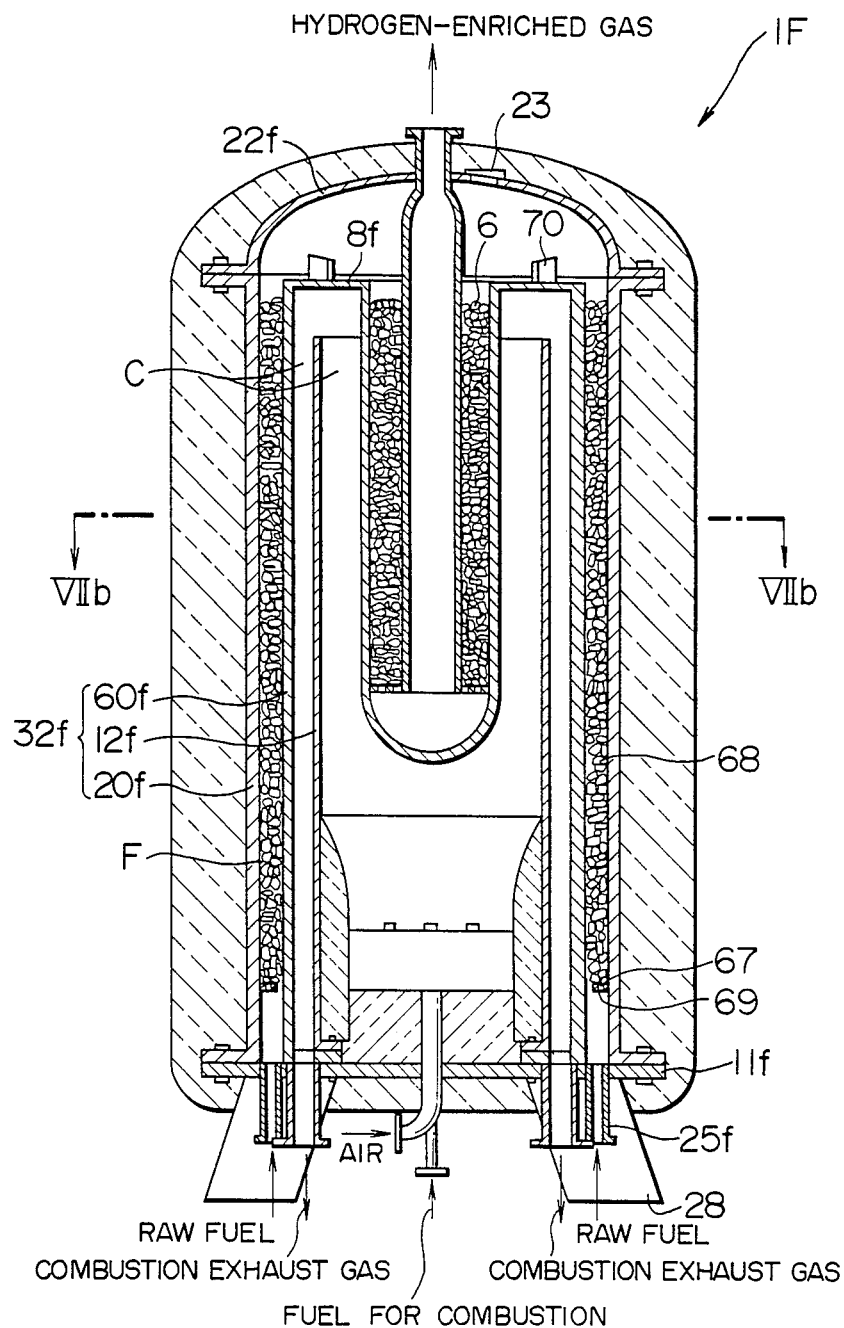
FIG. 7a is a vertical cross-sectional view of a fuel reforming apparatus in accordance with a seventh embodiment of the present invention.

FIG. 7a shows a fuel reforming apparatus 1F in accordance with a seventh embodiment of the present invention. Description will be made hereafter of its differences with the fuel reforming apparatus 1E according to the fifth embodiment shown in FIG. 6a.

Figure 7B:
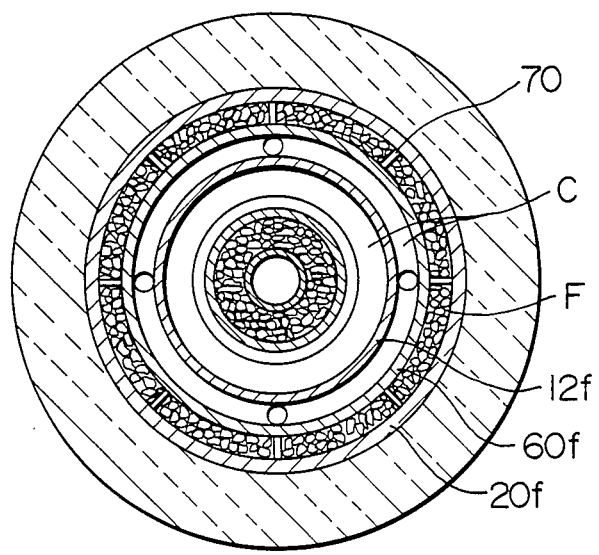

In FIG. 7a, drift preventing plates 70 jointed to a heat-exchange wall 60f are disposed in the supplying passage F for fuel gas in which the reforming catalyst 68 is accommodated, in such a manner as to project vertically from a bottom plate 11f. One longitudinal end of each of the drift preventing plates 70 penetrates the catalyst supporting plate 67, and abuts against the bottom plate 11f, while the other end thereof projects from a supporting plate 8f toward the side of an end plate 22f. FIG. 7b is a cross-sectional view taken along the line VIIb—VIIb of FIG. 7a. Incidentally, each of the drift preventing plates 70 has a slight gap between the inner wall 20f of the reforming apparatus and the catalyst supporting plate 67 so as to prevent the collision therebetween at the time of thermal expansion. By virtue of the above-described arrangement, the amount of influx of the raw fuel from raw fuel tubes 25f into the layer filled with the reforming catalyst 68 inside the supplying passage F for fuel gas is distributed uniformly. Upon completion of reaction with the reforming catalyst 68, the gas containing unreacted raw fuel passes through the layer filled with the reforming catalyst 6, is converted to a hydrogen-enriched gas, and is discharged to outside the fuel reforming apparatus 1F.

According to the seventh embodiment, since the uniform reaction with the reforming catalyst is promoted, in addition to the advantages of the sixth embodiment shown in FIG. 6a, there are advantages in that there is no unevenness in some reforming catalyst, and that the life of the overall reforming catalyst is prolonged as a result.

Figure 8:
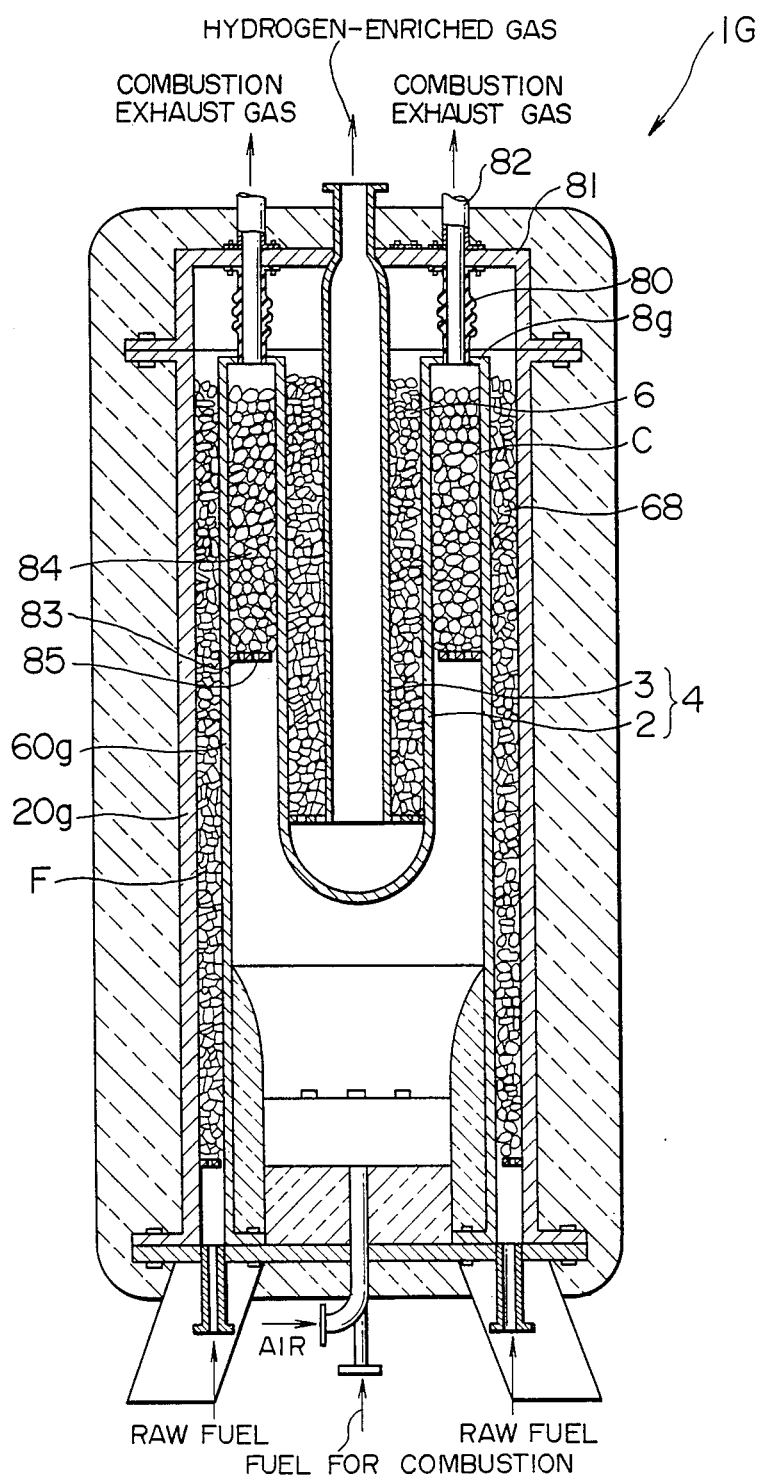
FIG. 8 is a vertical cross-sectional view of a fuel reforming apparatus in accordance with an eighth embodiment of the present invention.

FIG. 8 shows a fuel reforming apparatus 1G in accordance with an eighth embodiment of the present invention. This fuel reforming apparatus is similar to the fuel reforming apparatus 1E shown in FIG. 6a, but differs from the same in the following aspects.

In the fuel reforming apparatus 1G shown in FIG. 8, a guide wall for combustion gas is not provided, and the combustion gas is discharged outside the fuel reforming apparatus 1G through bellows 80 provided penetrating a supporting plate 8g. At that juncture, since each of the bellows 80 is flange-connected to an upper cover 81 which is flange-connected to an inner wall 20g of the reforming apparatus, a highly reliable material which is sufficiently capable of following the thermal expansion or shrinkage of a heat-exchange wall 60g and the upper cover 81 at a temperature of about 650° C. is used as the bellows 80. In the upper cover 81, exhaust tubes 82 for discharging the combustion gas are adapted to form combustion gas passages with the upper cover 81 placed between the exhaust tubes 82 and the bellows 80. In addition, a particle supporting plate 83 is welded to the heat-exchange wall 60g in the combustion gas passage C between the outer reaction tube 2 and the heat-exchange wall 60g. As a result, heat conductance acceleration particles (alumina particles) 84 are supported by the particle supporting plate 83 toward the supporting plate 8g. Accordingly, the bellows 80 are also used as ports for charging the heat conductance accelerating particles 84. The flow rate of the fuel gas is accelerated by the presence of the heat conductance accelerating particles. By virtue of the above-described arrangement, heat conductance from the combustion gas to the reforming catalysts 6 and 68 is accelerated.

According to the eighth embodiment, since the guide wall for combustion gas and the combustion gas passage C between the guide wall for combustion gas and the heat-exchange wall 60g are dispensed with, there is an advantage in that the fuel reforming apparatus becomes slender, so that a space for installing the apparatus can be small.

What is claimed is:

1. A fuel reforming apparatus, comprising:
   a reaction tube means forming a volume where an endothermic reaction for converting a fuel gas, with steam mixed therein, into hydrogen-enriched gas, using a catalyst, occurs, with said volume including means for retaining a catalyst therein, said reaction tube means having an inlet means for transmitting fuel gas with steam mixed therein into the volume and outlet means for removing hydrogen-enriched gas from the volume;
   a combustor for generating a combustion gas, to heat said reaction tube means;
   combustion gas passage means for passing said combustion gas adjacent said reaction tube means so as to heat said reaction tube means, said combustion gas passage means being positioned around the volume, said combustion gas passage means including a combustion gas outlet means for discharging combustion gas from the fuel reforming apparatus, the inlet means for transmitting fuel gas with steam mixed therein into the volume including a fuel gas supplying passage means disposed around the combustion gas passage means and in heat exchange relationship with the combustion gas passage means, the fuel gas supplying passage means having means for retaining a catalyst therein;
   fuel passage means for supplying fuel to the combustor;
   air passage means for supplying air to the combustor; and
   insulating layer means for preventing heat radiation from the fuel forming apparatus, the insulating layer means being disposed around the fuel gas supplying passage means.

2. A fuel reforming apparatus according to claim 1, further comprising a catalyst filling said volume, and retained therein by said means for retaining a catalyst therein.

3. A fuel reforming apparatus according to claim 2, further comprising a catalyst filling said fuel gas supplying passage means, and retained therein by the means for retaining a catalyst in the fuel gas supplying passage means.

4. A fuel reforming apparatus according to claim 1, further comprising a catalyst filling said fuel gas supplying passage means, and retained therein by the means for retaining a catalyst in the fuel gas supplying passage means.

5. A fuel reforming apparatus according to claim 1, wherein the fuel gas supplying passage means and the combustion gas passage means have a common heat-exchange wall providing the heat-exchange relationship between the fuel gas supplying passage means and the combustion gas passage means.

6. A fuel reforming apparatus according to claim 5, further comprising a catalyst filling said volume, and retained therein by said means for retaining a catalyst therein.

7. A fuel reforming apparatus according to claim 6, further comprising a catalyst filling said fuel gas supplying passage means, and retained therein by the means for retaining a catalyst in the fuel gas supplying passage means.

8. A fuel reforming apparatus according to claim 1, wherein the combustion gas passage means comprises means for retaining heat conductance acceleration particles in said combustion gas passage means adjacent said reaction tube means.

9. A fuel reforming apparatus according to claim 8, further comprising heat conductance acceleration particles in said combustion gas passage means, adjacent said reaction tube means, retained in the combustion gas passage means by said means for retaining heat conductance acceleration particles.

10. A fuel reforcing apparatus according to claim 9, wherein said combustion gas outlet means includes bellows means.

11. A fuel reforming apparatus according to claim 1, further comprising drift preventing plates disposed in said fuel gas supplying passage means.

12. A fuel reforming apparatus according to claim 1, wherein the reaction tube means has a double tube structure, said volume being between the two tubes of the double tube structure.

* * * * *